(12) United States Patent
Bringuier

(10) Patent No.: US 6,487,347 B2
(45) Date of Patent: *Nov. 26, 2002

(54) INDOOR/OUTDOOR OPTICAL CABLES

(75) Inventor: Anne G. Bringuier, Taylorsville, NC (US)

(73) Assignee: Corning Cable Systems LLC, Hickory, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/217,527

(22) Filed: Dec. 21, 1998

(65) Prior Publication Data

US 2002/0001443 A1 Jan. 3, 2002

Related U.S. Application Data

(63) Continuation-in-part of application No. 08/823,260, filed on Mar. 24, 1997, now Pat. No. 5,852,698.

(51) Int. Cl.⁷ .................................................. G02B 6/44
(52) U.S. Cl. ...................................... 385/113; 388/109
(58) Field of Search ................................ 385/113, 109, 385/112, 114

(56) References Cited

U.S. PATENT DOCUMENTS

| | | | |
|---|---|---|---|
| 4,892,382 A | 1/1990 | Story et al. | 350/96.23 |
| 4,893,893 A | 1/1990 | Claxton et al. | 350/96.23 |
| 4,913,517 A | 4/1990 | Arroyo et al. | 350/96.23 |
| 5,148,509 A | 9/1992 | Kannabiran | 385/109 |
| 5,208,889 A | 5/1993 | Cedrone et al. | 385/114 |
| 5,389,442 A | 2/1995 | Arroyo et al. | 428/396 |
| 5,566,266 A | 10/1996 | Nave et al. | 285/113 |
| 5,574,816 A | 11/1996 | Yang et al. | 385/109 |
| 5,740,295 A | * 4/1998 | Kinard et al. | 385/109 |
| 5,748,823 A | 5/1998 | Nave | 385/113 |
| 5,822,485 A | * 10/1998 | Nelson et al. | 385/112 |
| 5,852,698 A | * 12/1998 | Bringuier | 385/113 |

FOREIGN PATENT DOCUMENTS

| | | | | |
|---|---|---|---|---|
| EP | 0349206 A2 | 1/1990 | | G02B/6/44 |
| EP | 0762171 A1 | 3/1997 | | G02B/6/44 |
| JP | 01245205 | 9/1989 | | G02B/6/44 |

OTHER PUBLICATIONS

Lucent Technologies Product Literature, CampusMax™ Outside Plant Cables; 5024FS NAK May, 1996.

(List continued on next page.)

*Primary Examiner*—Michael P. Stafira
(74) *Attorney, Agent, or Firm*—Timothy J. Aberle

(57) ABSTRACT

A fiber optic cable suitable for indoor applications includes a core tube surrounding a plurality of coated optical fibers; a jacket formed of a polymer material surrounding the core tube; and at least one layer of strength members disposed between said core tube and said jacket. The jacket has an outer diameter of not greater than about 7 to 12 mm and the coated optical fibers experience a short-term increase in signal attenuation of no more than about 0.01 dB when the cable is looped in a radius of 5 centimeters.

16 Claims, 2 Drawing Sheets

OTHER PUBLICATIONS

Berk–Tek Product Literature; Berk–Tek UNI–Lite Optical Fiber Cable Riser Outside Plant Series. Revision Date: Mar. 10, 1995.

IWCS Proceedings 1996, Development of a Riser Rated Indoor/Outdoor Loose Tube Fiber Optic Cable; Scott M. Chastain and James W. Thornton; pp. 369–373.

LightWave Magazine, Oct. 1997, p. 22.

BICC Brand–Rex Cable Samples, Fall, 1997.

IBM Technical Disclosure Bulletin; vol. 39, No. 01; Jan. 1996.

Singlemode, General Purpose OSP Cable AccuRibbon Core, Dielectric Sheath High Fiber Count AccuRibbon OSP Cable—RFX; Lucent Technologies, Fiber Optic Products, Jun. 1997; 2A–47.

* cited by examiner

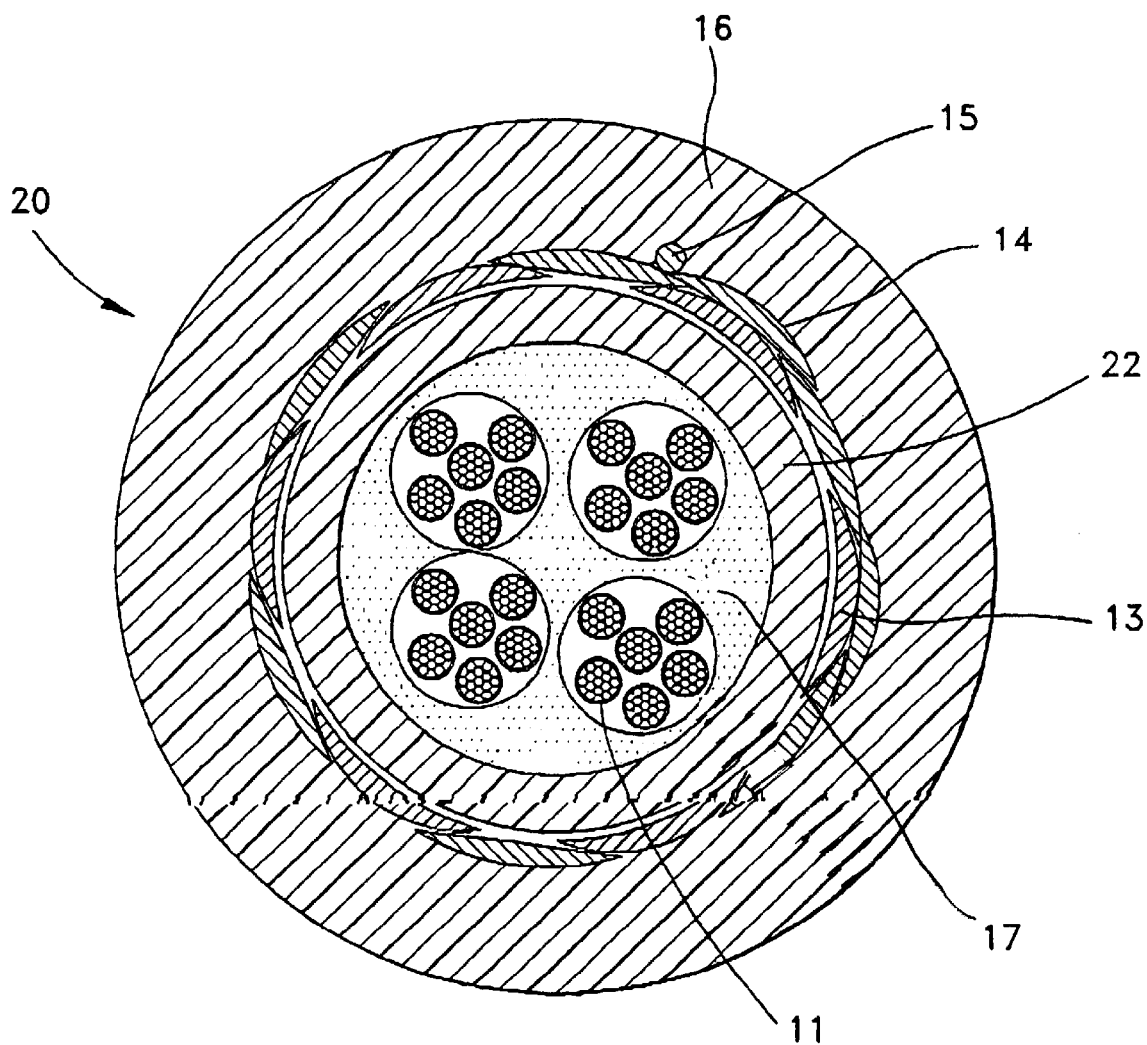

INDOOR/OUTDOOR OPTICAL CABLES

The present invention is a Continuation-in-Part of U.S. Ser. No. 08/823,260, now U.S. Pat. No. 5,852,698 filed Mar. 24, 1997 the entirety of which is incorporated by reference herein.

BACKGROUND OF THE INVENTION

This invention relates to optical fiber cables which are suitable for use within building vertical shafts and also are provided with protection against moisture internal migration. In particular, this invention relates to single-tube design optical fiber cables suitable for such uses.

Drop cables are outdoor cables which bring telephone service to buildings, whereas riser cables provide telephone service within buildings. Riser cables extend upwards from basement vaults to wiring closets located on upper floors.

Drop cables must be able to withstand the changing conditions found in the outdoor environment. Most materials increase in length and volume with increases in temperature and decrease in length and volume with decreases in temperature. Each material may have a different rate of change of length given a specified change in temperature. Such a rate is called the coefficient of thermal expansion for a material. Because different materials in a cable may have different coefficients of thermal expansion, temperature changes may induce strains in the cable components. For this reason, changes in optical fiber attenuation over different temperatures are measured in cables intended for outdoor use. Successful cables must not experience unacceptable increases in optical fiber attenuation caused by cable strains induced by temperature-related conditions.

Drop cables also must be protected against migration of moisture within the cable. Although cable jackets are intended to prevent the ingress of water into the cable, no plastic material perfectly stops the ingress of moisture. Furthermore, water may enter a cable at points where the cable jacket has been damaged, or at the end of the cable. Therefore, longitudinal movement of water along the inside of the cable must be prevented. For this reason, waterblocking or water-absorptive material is provided in cable interstices which otherwise could act as conduits for moisture internal migration. Types of materials which may be used for this purpose are gel-like filling and flooding compounds. Filling compounds are disposed alongside the optical fibers within buffer tubes, while flooding compounds are disposed in spaces between the cable jacket and the buffer tubes holding the optical fibers. Many filling and flooding compounds are oil or grease-based. As a result, most filling and flooding compounds provide fuel for combustion. However, most cables intended for outdoor use are not required to be flame-retardant.

Other types of materials are becoming more widely used in outdoor use cables for protection against cable moisture migration. Examples include water-absorptive polymers, which may be inserted into a cable as loose powders or incorporated into tapes which are wrapped about other cable components. Another example is water blocking strength members, as disclosed in U.S. Pat. No. 4,913,517 and 5,389,442.

Cables intended for use within buildings normally are not exposed to the moisture and extreme temperature conditions experienced by cables intended for outdoor use. However, building cables are required by the National Electrical Code to meet criteria indicating that the cables will not act to spread fires within a building. The most well-known test standard for riser-rated cables is Underwriters Laboratories (UL) Standard 1666, "Test for flame propagation height of electrical and Optical-fiber Cables installed vertically in Shafts" (Second Edition, Jan. 22, 1991). The second edition of this standard is referred to herein as UL Standard 1666.

An optical fiber service cable designed to be suitable for both indoor and outdoor use is disclosed in U.S. Pat. No. 5,566,266, which issued on Oct. 15, 1996 in the names of Navé and McDowell. However, the disclosed cable is designed for use with a rather high optical fiber count and discloses an inner tube which itself has an outer diameter of 10.2 mm. Such a cable could not be connectorized using standard buffer tube fanout kits. The cable also employs a tape formed from materials such as a polyimide. Such tapes significantly add to the cost of the cable, and it is necessary to process and splice such tapes.

SUMMARY OF THE INVENTION

It is therefore an object of the present invention to provide riser-rated cables having a small diameter and low minimum bend radius which also is formed using low-cost materials.

These and other objects are provided, according to the present invention, by fiber optic cables suitable for both outdoor and indoor applications, comprising: a core tube having an OD of about 3.0 mm or more surrounding a plurality of coated optical fibers; a jacket formed of UV-resistant flame-retardant polymer material surrounding said core tube; and at least one layer of strength members disposed between said core tube and said jacket. The jacket can have an OD of about seven mm or more. The coated optical fibers can experience a short-term increase in signal attenuation of no more than about 0.01 dB when the cable is looped in a radius of 5 centimeters. The strength members can be wrapped around the core tube in opposite directions and the set of two strength member layers can be disposed between and directly contiguous to said core tube and said jacket. The cable is capable of meeting the flame retardance requirements set out in UL Standard 1666 in the absence of a flame-resistant tape. The strength members may be impregnated with a water blocking material.

BRIEF DESCRIPTION OF THE DRAWINGS

The present invention embodiments of the invention are described in the several drawings, in which:

FIG. 3 is a cross-sectional view of a fiber optic cable according to the present invention.

DETAILED DESCRIPTION OF THE INVENTION

The present invention will be described more fully hereinafter with reference to the accompanying drawings, in which one or more embodiments of the invention are shown. This invention may, however, be embodied in many different forms and should not be construed as limited to the embodiments set forth herein; rather, these embodiments are provided so that the disclosure will fully convey the scope of the invention to those skilled in the art. Like numbers refer to like elements throughout. The drawings are not necessarily drawn to scale but are configured to clearly illustrate the invention.

Figure 1:
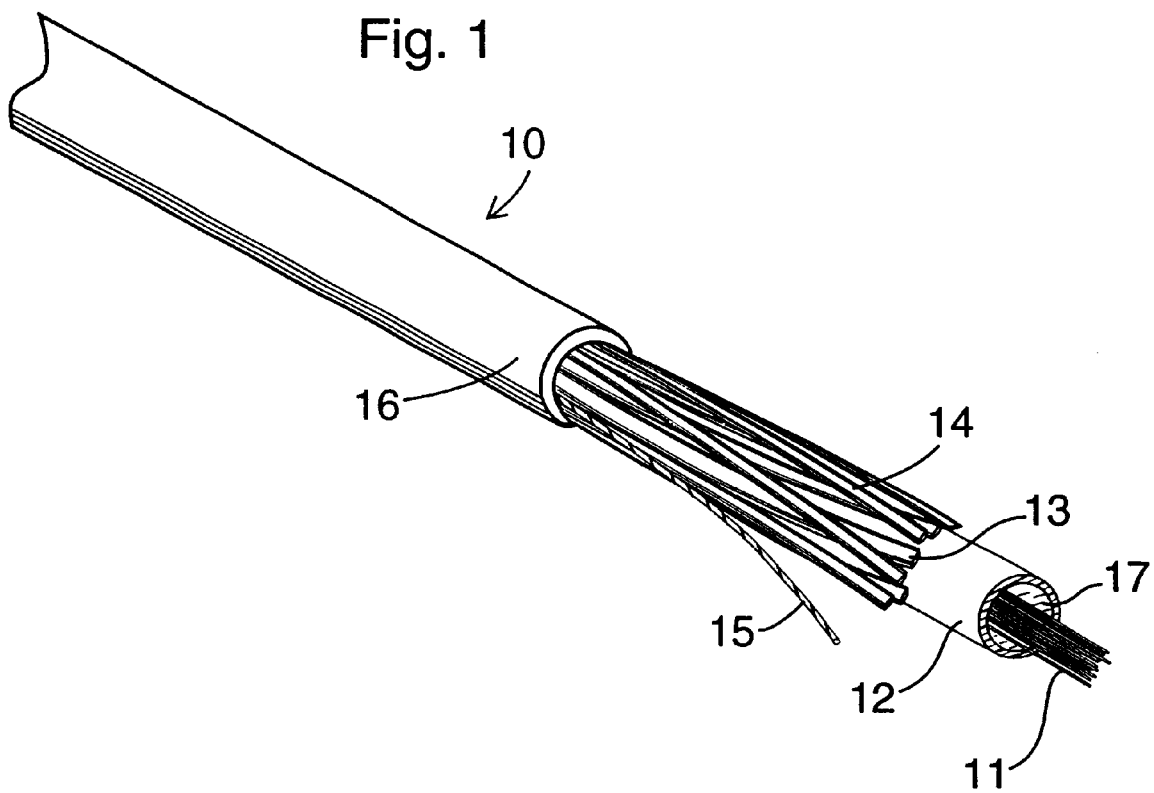
FIG. 1 is a cut-back perspective view of a cable according to a first embodiment; and, FIG. 2 is a cross-sectional view of the cable of FIG. 1.
Figure 2:
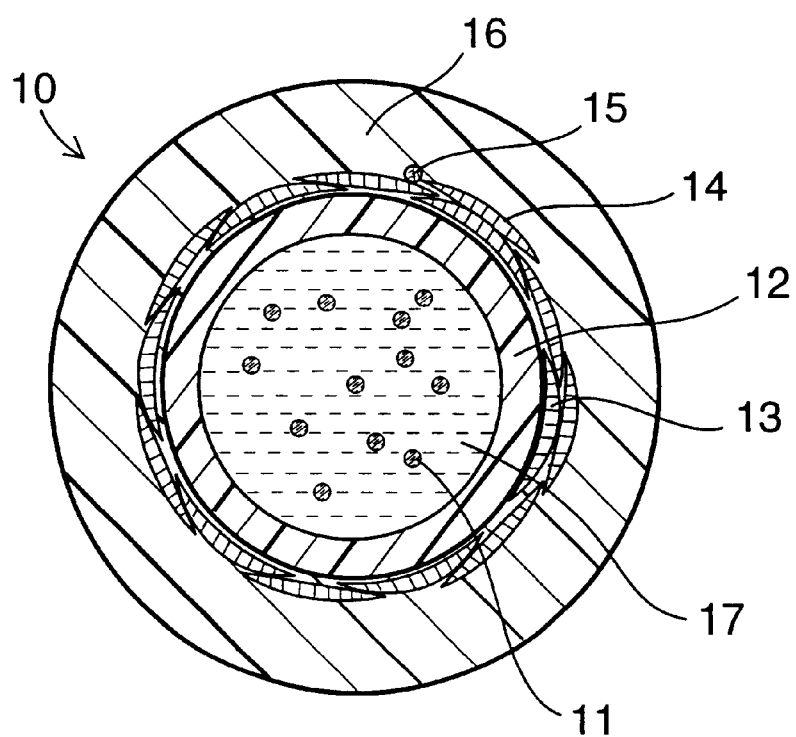

A cable 10 according to a first embodiment of the present invention is shown in FIGS. 1 and 2. Cable 10 is designed to include from two to twelve coated and colored 250 μm optical fibers 11. Optical fibers 11 may be either single-mode or multimode fibers, or a mixture of single-mode and multimode fibers. Core tube 12 also may contain a filling compound 17 disposed in the space within the core tube not occupied by the optical fibers. The optical fibers 11 typically are not stranded with each other, and have a length which is from 0% to 0.2% greater than the length of core tube 12. Core tube 12 itself may be formed from a flexible plastic material such as polypropylene (PP). Core tube 12 need not be formed from flame-retardant material.

According to a first embodiment of the present invention (FIGS. 1–2), core tube 12 may have an inner diameter of about 1.8 mm and an outer diameter of about 3.0 mm, and loosely contains the optical fibers 11. Buffer tubes having an outer diameter of about 3.0 mm are widely used, so that the buffer tube may be connectorized using equipment which is already available to the industry. Core tube 12 may have an OD greater than about 3.0 mm.

An inside layer 13 and an outside layer 14 of flexible strength members are stranded in opposite directions about core tube 12. In a cable according to the first embodiment, eight yarns form outside layer 14 and six yarns form inside layer 13. Inside strength member layer 13 is contiguous to core tube 12; outside strength member layer 14 is directly contiguous to inside strength member layer 13; and jacket 16 is directly contiguous to outside strength member layer 13. A polyester ripcord 15 lies at the inner surface of jacket 16.

The strength members forming layers 13 and 14 are chosen to be highly flexible. For example, the strength members forming layers 13 and 14 can be Advantex or Aquablok reinforcements, available from Owens Corning, which are fiberglass yarns including a superabsorbent polymer, or flexible rovings from NEPTCO including a water blocking substance thereon. The reinforcements swell up to five times their own weight in deionized water, providing effective water-blocking protection to the space between jacket 16 and buffer tube 12.

These strength members are chosen to provide sufficient anti-buckling and tensile strength to the cable. The exemplary reinforcements have a tensile modulus of elasticity of $7 \times 10^4$ MPa, allowing the cables according to the present invention to have, for example, a maximum tensile loading during installation of 1320 N, and a long term maximum tensile load of 330 N.

The outer jacket 16 may be formed from polyvinyl chloride material which is both ultraviolet resistant and flame retardant, adapting the cables according to the present invention for both indoor and outdoor use. According to the first embodiment of the invention, the average outer diameter of the outer jacket 16 may be about 7.0 mm or less.

A sample cable according to the first embodiment of the present invention having a length of 20 m containing three multimode fibers and nine single-mode fibers was tested for optical fiber attenuation at low bend radius. The cable excess fiber length percentage was 0.2%. The single-mode fibers were concatenated and terminated separately from the multimode fibers. Attenuation test sets operating at 1300 nm for multimode fibers and 1550 nm for single-mode fibers were connected to the concatenated fibers. The cable sample was placed in a loop using a template with a possible radii range of 8 cm to 2 cm. The loop diameter was slowly decreased from 8 cm down to 2 cm while the optical attenuation (Δ dB) was measured. Table 1 sets out the results. (Results at 2 cm are not reproduced, as the optical fiber itself has a minimum bend radius of about 2.5 cm for long-term mechanical reliability). Due to the nature of the test, single-mode values are to be divided by nine, and multimode values are to be divided by 3 to obtain average values for individual optical fibers.

TABLE 1

Change in attenuation (Δ dB) in concatenated optical fibers at different cable bend radii; results given separately for single-mode (SM) and multimode (MM)

| Bend Radius | 8 cm | 7 cm | 6 cm | 5 cm | 4 cm | 3 cm |
|---|---|---|---|---|---|---|
| Trial 1 SM | 0.00 | 0.00 | 0.02 | 0.02 | 0.04 | 0.09 |
| Trial 1 MM | 0.00 | 0.01 | 0.01 | 0.02 | 0.04 | 0.07 |
| Trial 2 SM | 0.00 | 0.00 | 0.00 | 0.01 | 0.03 | 0.03 |
| Trial 2 MM | 0.00 | 0.00 | 0.01 | 0.03 | 0.05 | 0.05 |
| Trial 3 SM | 0.00 | 0.01 | 0.01 | 0.01 | 0.02 | 0.03 |
| Trial 3 MM | 0.00 | 0.01 | 0.01 | 0.01 | 0.02 | 0.05 |

When the proper division is made, it is seen that both the single-mode and the multimode individual optical fibers had a change of signal attenuation of 0.01 dB or less at a cable bend radius of 5 cm. Furthermore, the cable did not kink even at a bend radius of 2 cm.

Cables according to the present invention perform very well during stripping, handling, and bending. Because of the small outside diameter and flexibility of the cable, a ring cut is difficult to make in the jacket using a hook blade. Use of a straight blade for this purpose therefore is recommended.

Cables according to the present invention may be used in interbuilding and intrabuilding backbones in aerial, duct, or riser applications. These cables have a specified operating temperature of −40° C. to +70° C. These cables are UL 1666 listed and meet the requirements of ICEA-596.

The cable core comprising tube 12, filling compound 17 and coated optical fibers 11 may be made using either a vertical or horizontal buffering line as known to the prior art. Spinners may be used to apply strength reinforcement member layers 13 and 14. The tension applied to the strength members may be 350 g, and their lay length may be 250 mm. In jacketing cables according to the first embodiment of the present invention, a tip diameter of 5.25 mm and a die diameter of 7.0 mm may be used. Six inches may separate the die orifice and a cooling water vat, and the extruder temperature profile used in forming the outer jacket may cover the range 142–1850° C. A line speed of 25 m/min. may be employed. Aramid fiber yarns coated with a swellable powder or film are alternative strength members which may be used. A flame-retardant polyethylene material may be used as a jacket material for zero halogen, low smoke applications.

Core tubes having an OD greater than 3.0 mm can be used in cables of the present invention (FIG. 3). For example, the present invention may be practiced in the form of a fiber optic cable 20 with bundled optical fibers 11 disposed in a core tube 22 formed of, e.g., PP that may have a filling compound 17 or a dry water swellable compound therein for blocking the flow of water. The OD of core tube 22 may be in the range of about 3.0 mm to about 6.0 mm or more. Fiber optic cable 20 can include one or more layers of strength members 13,14 as in the embodiment of FIGS. 1–2, for example, eight yarns form outside layer 14 and six yarns form inside layer 13. Inside strength member layer 13 is generally contiguous to core tube 12; outside strength member layer 14 is generally contiguous to inside strength member layer 13; and jacket 16 is generally contiguous to outside strength member layer 13. Fiber optic cable 20 can include a jacket 26 with one or more ripcords 15. Since the OD of core tube 12 can be in the range of about 3.0 mm to about 6.0 mm or more, the OD of jacket 26 can be, for example, about 7.0 mm or less to about 12 mm or more.

It is to be understood that the invention is not limited to the exact details of the construction, operation, exact materials, or embodiments shown and described, as modifications and equivalents will be apparent to one skilled in the art without departing from the scope of the invention.

What is claimed is:

1. A fiber optic cable suitable for indoor applications, comprising:
   a core tube surrounding a plurality of coated optical fibers;
   a jacket formed of a polymer material surrounding said core tube; and
   at least one layer of strength members disposed between said core tube and said jacket, said strength members perform an anti-buckling function in said fiber optic cable whereby said coated optical fibers experience a short term delta attenuation of no more than about 0.01 dB when the cable is looped in a radius, the radius comprising a loop of about five centimeters.

2. The fiber optic cable of claim 1, wherein the OD of the core tube is in the range of about 3.0 mm to about 6.0 mm.

3. The fiber optic cable of claim 1, wherein the OD of the jacket is in the range of about 7.0 mm or less to about 12.0 mm.

4. The fiber optic cable of claim 1, wherein at least some of said strength members are impregnated with a dry water absorbent substance.

5. The fiber optic cable of claim 1, wherein two layers of said strength members are disposed about said core tube.

6. The fiber optic cable of claim 5, said at least one layer of strength members being stranded in a direction of lay that is substantially opposite to the direction of lay of an other layer of strength members.

7. The fiber optic cable of claim 6, wherein said first and second layers comprise strength members that are oblong in cross section.

8. A fiber optic cable, comprising:
   a cable jacket;
   a core tube; said core tube having at least one optical fiber therein and an outside diameter of about 6 mm or less; and
   strength members, said strength members generally encircling said core tube, at least one of said strength members being contiguous with said core tube, being contiguous with said jacket, and being contiguous with at least one other of said strength members for minimizing attenuation in said at least one optical fiber.

9. The fiber optic cable of claim 8, wherein said at least one of said strength members that is contiguous with said core tube, is contiguous with at least two of said strength members for minimizing attenuation in said at least one optical fiber.

10. The fiber optic cable of claim 8, wherein at least some of said strength members are impregnated with a dry water absorbent substance.

11. The fiber optic cable of claim 8, wherein the OD of the jacket is in the range of about 7.0 mm or less to about 12.0 mm.

12. A fiber optic cable, comprising:
    a cable jacket;
    a core tube, said core tube having at least one optical fiber therein and an outside diameter of about 7 mm or less; and
    strength members, said strength members being arranged in a generally encircling, staggered pattern about said core tube wherein a first layer of said strength members is generally arranged so that strength members of the first layer are in contact with said core tube, and wherein a second layer of said strength members is generally arranged so that strength members of the second layer are in contact with said jacket but are not in contact with said core tube.

13. The fiber optic cable of claim 12, wherein said first layer of strength members is stranded in a direction of lay is substantially opposite to the direction of lay of said second layer of strength members.

14. The fiber optic cable of claim 12, wherein said first and second layers comprise strength members that are oblong in cross section.

15. The fiber optic cable of claim 12, wherein at least some of said strength members are impregnated with a dry water absorbent substance.

16. The fiber optic cable of claim 12, wherein the OD of the jacket is in the range of about 7.0 mm or less to about 12.0 mm.

* * * * *